United States Patent

Cavallotti et al.

Patent Number: 5,691,071
Date of Patent: Nov. 25, 1997

[54] SURFACE-TREATED METAL WIRE FOR USE IN THE MANUFACTURE OF REINFORCEMENT STRUCTURES FOR PRODUCTS MADE OF ELASTOMER MATERIAL, AND A PROCESS THEREFOR

[75] Inventors: Pietro Cavallotti, Milan; Federico Pavan, Florence, both of Italy

[73] Assignee: Pirelli Coordinamento Pneumatici S.p.A., Milan, Italy

[21] Appl. No.: 508,026

[22] Filed: Jul. 27, 1995

[30] Foreign Application Priority Data

Jul. 28, 1994 [IT] Italy .................... MI94A1627

[51] Int. Cl.⁶ ................ B60C 9/00; B32B 15/06
[52] U.S. Cl. ............ 428/607; 428/655; 428/659; 428/625; 428/935; 57/902; 152/451
[58] Field of Search .................. 428/607, 655, 428/659, 625, 935; 57/902; 152/565, 451, 556

[56] References Cited

U.S. PATENT DOCUMENTS

| | | | |
|---|---|---|---|
| 4,651,513 | 3/1987 | Dambre | 57/902 |
| 4,677,033 | 6/1987 | Coppens et al. | 428/677 |
| 4,704,337 | 11/1987 | Coppens et al. | 428/625 |
| 4,883,722 | 11/1989 | Coppens et al. | 152/565 |
| 5,002,837 | 3/1991 | Shimogori et al. | 428/655 |
| 5,014,760 | 5/1991 | Bombeke et al. | 57/902 |
| 5,043,230 | 8/1991 | Jagannathan et al. | 428/655 |
| 5,082,748 | 1/1992 | Ahn et al. | 428/656 |
| 5,221,559 | 6/1993 | Martigny et al. | 152/565 |

FOREIGN PATENT DOCUMENTS

| | | |
|---|---|---|
| 0188036 | 7/1986 | European Pat. Off. |
| 0188851 | 7/1986 | European Pat. Off. |
| 0418634 | 3/1991 | European Pat. Off. |
| 60-050175 | 3/1985 | Japan |
| 01031837 | 2/1989 | Japan |

*Primary Examiner*—John J. Zimmerman
*Attorney, Agent, or Firm*—Watson Cole Stevens Davis, P.L.L.C.

[57] ABSTRACT

A metal wire, having a steel core and being provided with a layer of cladding of a zinc/manganese alloy containing between 5% and 80% of manganese. The wire is used as a reinforcement structure for tires or other products of elastomer material. Several embodiments of a process for applying the cladding on the steel core by electrodeposition of the zinc/manganese alloy are also described.

33 Claims, 2 Drawing Sheets

| CLADDING | TIME FOR FORMATION OF RUST (MIN) |
|---|---|
| BRASS | 30 |
| Zn | 240 |
| ZnCo | 1152 |
| NiZn/ZnCo | 1720 |
| ZnMn 5% | 360 |
| ZnMn 30% | 2400 |
| ZnMn 80% | 20000 |

| CLADDING | TIME FOR FORMATION OF RUST (MIN) |
|---|---|
| BRASS | 30 |
| Zn | 240 |
| ZnCo | 1152 |
| NiZn/ZnCo | 1720 |
| ZnMn 5% | 360 |
| ZnMn 30% | 2400 |
| ZnMn 80% | 20000 |

| CLADDING | F(N) |
|---|---|
| BRASS 70/30 | 2350 |
| Zn 100% | 2005 |
| Zn/Mn (5-60%) | 2310 |
| Mn 100% | 1427 |

SURFACE-TREATED METAL WIRE FOR USE IN THE MANUFACTURE OF REINFORCEMENT STRUCTURES FOR PRODUCTS MADE OF ELASTOMER MATERIAL, AND A PROCESS THEREFOR

BACKGROUND OF THE INVENTION

The invention relates to a surface-treated metal wire for use in the manufacture of reinforcement structures for products made of elastomer material, the metal wire being of the type comprising a steel core provided with a metal alloy surface cladding.

The invention also relates to a process for manufacture of the surface-clad metal wire, as well as a reinforcement structure obtained with cords made of the metal wire and a pneumatic tire or other product made of elastomer material incorporating the reinforcement structure.

In particular, the metal wire of the invention is destined to be subjected to usual stranding operations to obtain the cords to be used in making reinforcement structures for tires and the like.

It is well known that pneumatic tires for vehicle wheels, as well as other manufactured products of elastomer material usually incorporate reinforcement structures made from cords each composed of a plurality of metal wires interconnected by means of usual stranding and twisting operations.

Normally the metal wires have a steel core on which a metal alloy cladding is deposited, said alloy having the double function of protecting the wire from corrosion and of assuring a good adhesion of the elastomer on the metal reinforcement structure.

Commonly the alloy used for cladding the wires is brass; more precisely, a copper/zinc alloy containing about 70% copper and 30% zinc.

In prior art alloys of this kind, numerous attempts to obviate the typical drawbacks inherent in their use have been made: such alloys are in fact notorious for the fact that on ageing their adhesion to the elastomer deteriorates due to a process of diffusion of the copper ions into the elastomer, which process also alters the mechanical characteristics of the elastomer.

For instance, Japanese patent publication JP 01-031,837 teaches cladding a steel wire with a non-ferrous metal, such as Cu, Zn, Mn, Sn or alloys thereof, with a layer of cobalt deposited on the alloys: adhesion is therefore achieved between the cobalt layer and the suitably-processed elastomer mix, which latter is obtained through addition of cobalt salts or other suitable adhesion-enhancers.

U.S. Pat. No. 4,677,033 discloses a steel-core metal wire clad with a ternary alloy composed of copper, zinc and manganese, the manganese being concentrated to a level of between 0.01% and 5% on the periphery of the cladding.

U.S. Pat. No. 4,704,337 teaches the application of a usual brass cladding on the metal core of the wire, on which cladding an external layer of a very hard material is deposited, chosen from a group comprising Fe, Mn, Cr, Mo, V, Ti, Zr, Ta, Hf and W.

The following alloys are also known from the prior art: zinc/cobalt and/or zinc/nickel, in single or double layers.

SUMMARY OF THE INVENTION

The present invention discloses that with a cladding of a binary alloy of zinc/manganese, with manganese levels chosen from a range comprised between 5% and 80%, it is possible to obtain an exceptionally good protection of the steel core from corrosion, without even minimally penalizing (with respect to usual brass alloys) the adhesion quality thereof with the elastomer mix, and also obtaining a surprisingly good drawability of the surface-treated wires.

In particular, the invention relates to a surface-treated metal wire for reinforcement structures in elastomer material products, in which the surface cladding is constituted by a zinc/manganese alloy, with a manganese content comprised between 5% and 80%.

In a preferred embodiment the manganese content is comprised between 30% and 70%.

In more detail, the surface cladding layer is formed by electrodeposition on the surface of the steel core, and exhibits after drawing a thickness of between 0.1 and 0.35 microns, the total diameter of the wire being between 0.15 and 0.35 mm.

In the present invention, in a first embodiment the metal wire is made by a process which comprises at least one immersion phase of the steel core in an electrolytic bath containing zinc sulphate and manganese sulphate, to cause deposition of the cladding layer, which layer is composed therefore of a zinc/manganese alloy with manganese content comprised between 5% and 80%.

In more detail, the electrolytic bath constitutes a water solution containing:

zinc sulphate heptahydrate at between 10 and 90 gr/liter;

manganese sulphate monohydrate at between 20 and 100 gr/liter;

sodium citrate at between 115 and 230 gr/liter.

The electrolytic bath is advantageously maintained at a temperature of between 20 degrees and 60 degrees celsius, with a pH value of between 4 and 6.

A cathodic current density of between 5 and 40 amperes per square decimeter (herein after abbreviated "A/dmq"), is applied to the electrolytic bath.

Alternatively, according to a further embodiment of the invention, the layers of zinc and manganese are deposited separately on the wire, and are heat diffused to constitute the alloy cladding.

A first further process embodiment comprises the steps of:

immersion of the steel core into at least a first electrolytic bath containing manganese sulphate, to cause electrodeposition of manganese on the external surface of the core;

immersion of the steel core into a second electrolytic bath containing zinc sulphate, to cause deposition of zinc on the external surface of the core;

heat diffusion of the zinc and manganese to form the layer of zinc/manganese alloy.

More specifically, the first electrolytic bath comprises a water solution containing:

manganese sulphate monohydrate at a concentration level between 80 and 120 gr/liter;

ammonium sulphate at a concentration of between 60 and 90 gr/liter; and ammonium thiocyanate at a concentration of between 40 and 80 gr/liter.

The first electrolytic bath is maintained at a temperature chosen from a range of between 20 degrees celsius and 40 degrees, with pH values between 4.5 and 5.5, preferably 5.

Cathodic current density of between 15 and 25 A/dmq is applied to the first electrolytic bath.

A second electrolytic bath contains:

zinc sulphate heptahydrate at a concentration of between 300 and 450 gr/liter;

sodium sulphate at a concentration of between 50 and 70 gr/liter.

The second bath is maintained at a temperature of between 20 and 30 degrees celsius, with pH value between 2 and 4.

Cathodic current density in the second electrolytic bath is between 20 and 40 A/dmq.

Advantageously the heat diffusion phase is effected by passing an electric current through the cladded wire to obtain resistance heating by means of the Joule effect on the metal wire.

In a second process embodiment, the compositions of the first and the second electrolytic bath are inverted.

BRIEF DESCRIPTION OF THE DRAWINGS

Further characteristics and advantages of the present invention will be better understood from the following detailed description of some preferred embodiments of the surface-treated metal wire for reinforcement structures for elastomer products, and of the process for obtaining the surface cladding, illustrated in the form of a non-limiting example in the accompanying drawings, in which.

DETAILED DESCRIPTION OF PREFERRED EMBODIMENTS

Figures 1, 2:
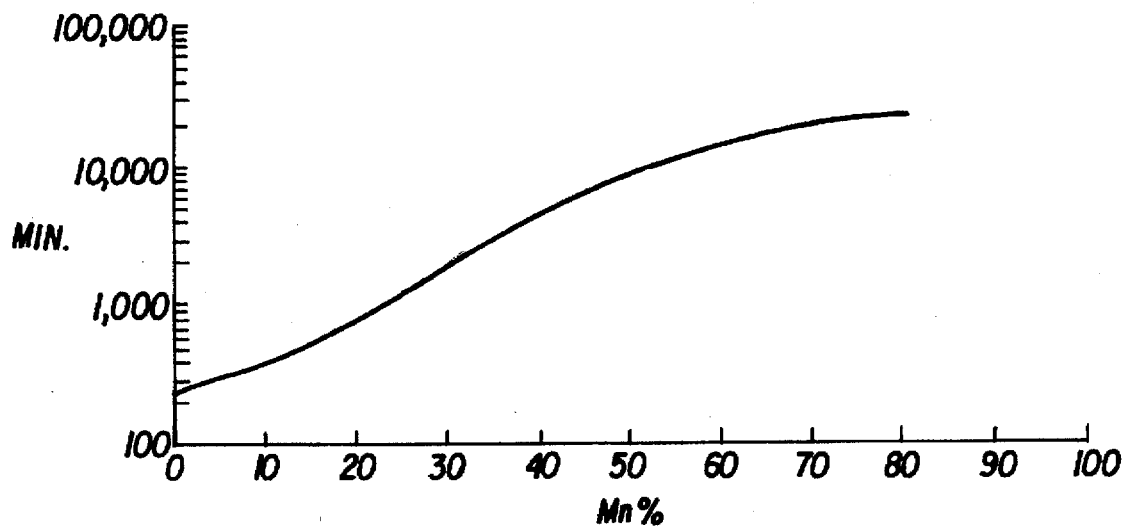
FIG. 1 is a graph which, with reference to a metal wire according to the invention, illustrates rust formation times on the y axis in comparison with the percentage of manganese in the zinc/manganese alloy deposited on the steel core as shown on the X axis.
FIG. 2 is a table of comparisons with reference to rust-resistance in a saline solution displayed by samples of the metal wire of the invention, in relation to that of other metal wire samples made according to various prior art processes.

The metal wire of the invention has a steel core provided with a metal alloy surface cladding, which has the two fold objective of protecting the core from corrosion and of assuring good adhesion of the wire to the elastomer in which it will be incorporated.

Further, the surface cladding must endow the metal wire with good drawability, to ease the drawing operations which will be carried out on the wire after deposition of the surface cladding.

In the present invention the surface cladding is constituted by a zinc/manganese alloy, in which the manganese level is chosen from a range of between 5% and 80%, and the cladding is obtained by electrodeposition on the external surface of the steel core.

For this reason, in a first embodiment of the process of the invention, after a pickling phase in sulphuric acid or the like, the steel core, fed continuously from a reel, is introduced into an electrolytic bath containing zinc sulphate and manganese sulphate, to cause deposition of the zinc/manganese alloy on the core.

More in detail, the electrolytic bath is constituted by a water solution containing:

zinc sulphate heptahydrate at a level of between 10 and 90 gr/liter;

manganese sulphate monohydrate at a level of between 20 and 100 gr/liter, preferably at 30 gr/liter; and sodium citrate at a level of between 115 and 230 gr/liter.

The temperature of the bath is preferably maintained constant between 20 and 60 degrees celsius.

The pH of the bath is maintained at between 4 and 6.

For the electrodeposition, stainless steel or zinc anodes can be used, and the cathodic current density in the bath is preferably between 5 and 40 A/dmq.

It should be noted that the above-mentioned temperatures, pH values and anodic current density have been chosen in accordance with the percentage of manganese desired in the electrodeposited alloy.

The percentage level of manganese in the alloy tends to increase proportionally with the increase in the pH value, and the density of anodic current, and to diminish proportionally with the increase in the electrolytic bath temperature.

The feed velocity of the steel core from the reel and thus the time it spends in the bath are regulated depending on the desired final thickness of the resulting cladding on the core.

In a preferred embodiment the final cladding thickness will be between 1.5 and 4 microns, as the diameter of the steel core subjected to electrodeposition is between 0.85 and 2 mm.

When it leaves the electrolytic bath, the clad wire can be subjected to a further pickling phase or a phosphating bath, then to be rewound on a reel or directly subjected to one or more drawing operations, which bring the final diameter of the wire to a value between 0.15 and 0.35 mm.

Alternatively to the above description, the formation of the surface coating on the steel core can be made by immersion thereof successively in a first and a second electrolytic bath by means of which first zinc and then manganese are deposited such that after a following heat diffusion phase by means of Joule effect the zinc/manganese alloy is created.

In more detail, the first electrolytic bath preferably comprises:

manganese sulphate monohydrate in a quantity between 80 and 120 gr/liter, preferably 100 gr/liter;

ammonium sulphate in a quantity between 60 and 90 gr/liter, preferably 75 gr/liter; and ammonium thiocyanate, in a quantity between 40 and 80 gr/liter, preferably 60 gr/liter.

The first bath is maintained at a temperature of between 20 and 40 degrees celsius, preferably at 25 degrees, and has a pH of between 4.5 and 5.5, preferably 5.

For manganese electrodeposition, the anodes used are preferably graphite/manganese at a ratio of 8:1, while the cathodic current density is between 15 and 25 A/dmq, preferably 20 A/dmq.

The second electrolytic bath is preferably a water solution containing:

zinc sulphate heptahydrate at between 300 and 450 gr/liter, preferably 370 gr/liter;

sodium sulphate at between 50 and 70 gr/liter, preferably 60 gr/liter.

The second bath is maintained at a temperature of between 20 and 30 degrees celsius, preferably at 25 degrees, with a pH value between 2 and 4, preferably 3.

For electrodeposition the anodes used are preferably zinc, and the cathodic current density applied is between 20 and 40 A/dmq, preferably 30 A/dmq.

In a further embodiment, the order of the above first and second baths is inverted, such that the zinc is electrodeposited before the manganese.

After electrodiffusion a pickling phase can be proceeded to, by means of a phosphating bath, and the resulting wire can be rewound on wheels or directly subjected to successive phases of drawing to bring it down to a desired diameter.

The advancement velocity of the wire from the reel and the length of time the steel core remains in the first and second electrolytic baths will be regulated such as to give the desired final thickness to the deposited cladding, as well as to obtain the desired percentage of manganese in the zinc/manganese alloy constituting the cladding.

It has been found that the zinc/manganese alloy surface cladding according to the present invention endows the treated wire with exceptional rust-resistant qualities, which tend to increase as the percentage of manganese in the alloy grows, as shown in the graph of FIG. 1.

More precisely, the graph of FIG. 1 shows, on the y-ordinate, the rust-formation times in minutes, with respect to the percentage of manganese in the zinc/manganese coating layer shown on the x-ordinate.

The graph relates to a test carried out by immersing test samples clad with a Zn/Mn alloy of 3 microns thickness in a water solution of NaCl at 5%.

It is easy to see how rust resistance qualities vary from a minimum of about 250 minutes, in a sample where Manganese was totally absent, up to a maximum of about 20,000 minutes, where the percentage of manganese was about 80%.

For the purposes of comparison, the table of FIG. 2 shows the minutes of rust resistance of the zinc/manganese clad samples where manganese percentages were at 5%, 30% and 60%, as well as the rust-resistance of corresponding samples clad in brass, Zn, Zn/Co, NiCo/ZnCo in a double layer.

Test conditions were the same as those described in reference to the graph of FIG. 1.

It can clearly be seen that with a manganese percentage of only 5% the resistance to rust is already more than 10 times the resistance of a normal brass cladding.

With manganese at 30% resistance to rust grows to over twice as much as that in the zinc/cobalt alloys, and is also decidedly superior to that of the NiZn/ZnCo double-layer claddings.

The wire treated according to the present invention further exhibits surprisingly good drawability properties, which was unexpected as manganese is a notoriously hard substance and would lead one to suppose the opposite.

However, notwithstanding the presuppositions, it was found that with the zinc/manganese cladding, especially if the manganese content is between 30% and 70%, excellent drawability was possible with minimum exfoliation consequences when the wire was passed through the drawplate.

The graph of FIG. 3 expresses the drawability of the wire of the present invention in terms of quantity of exfoliated cladding, expressed in grams per square meter, hereinafter abbreviated "gr/mg" on the ordinates, in accordance with the percentage of manganese in the Zn/Mn alloy, expressed on the x-coordinate.

Also worthy of note is the fact that wire made according to the present invention exhibits excellent adhesion characteristics to an elastomer material, which, as mentioned above, is fundamental to the mechanical resistance and durability of tires for vehicle wheels to which the invention will be applied in the form of a reinforcement structure made of webbing composed of metal wire of the invention.

Figures 3, 4:
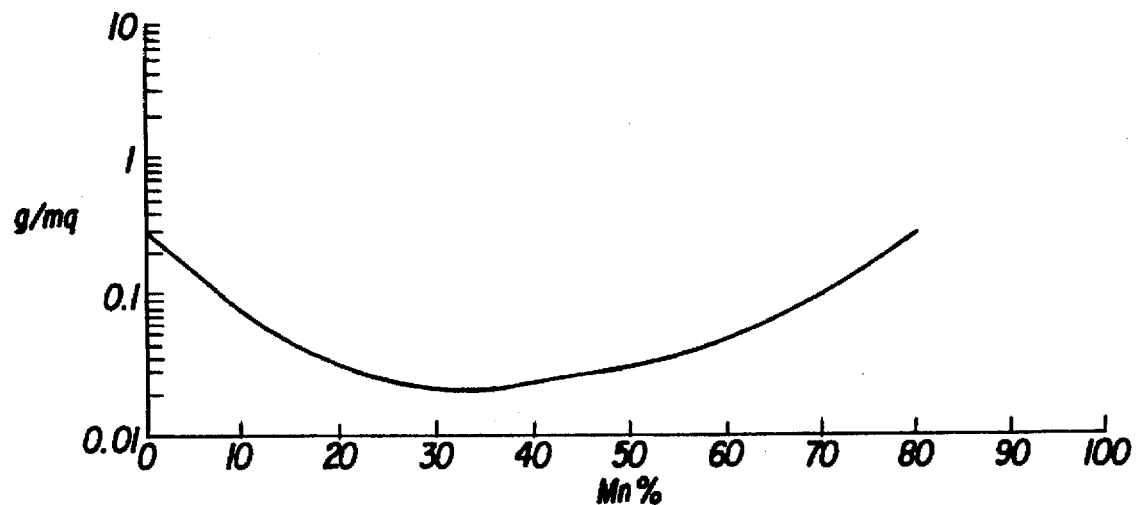
FIG. 3 is a graph showing the drawability of the metal wire of the invention, expressed on the axes as a quantity of exfoliated cladding in relation to the percentage of manganese in the zinc/manganese alloy deposited on the steel core.
FIG. 4 is a table of comparisons with reference to rubber-metal adhesion durability obtained by metal wire made according to the process of the present invention, with respect to metal wire made by prior art cladding processes.

FIG. 4, in fact, shows the durability of the adhesion of metal wires made according to the invention to the elastomer, deriving from various tests made on rubber specimens containing adhesion enhancers based on cobalt, and vulcanized for thirty minutes at 151 degrees celsius; the specimens being tested with coatings of brass (70% copper, 30% zinc), zinc, zinc/manganese (manganese content varied between 5% and 80%), and with manganese alone. In FIG. 4, right column, the force (F) needed to extract the wire from the elastomer is measured in Newtons (N).

The table clearly demonstrates how the zinc/manganese alloy results in no substantial qualitative decay in the rubber-metal adhesion in relation to the brass cladding.

The zinc/manganese alloy offers however the advantage of not bringing about qualitative decay in the rubber-metal adhesion over a considerable period of time, which is certainly not a characteristic of brass claddings, where the processes of dezincification and copper ion migration into the elastomer mix cause considerable decay.

It is strongly believed that the qualitative characteristics of the rubber-metal bond will be improved even more when further extensive testing leads to a refinement of the elastomer mix, especially with regard to better special adhesion enhancers and optimization of other factors such as, for example, the concentration of sulphur.

It is also believed that the drawability characteristics of the metal wire can be improved, with the application of special lubricants and/or suitable materials in the drawplates.

Particular attention is drawn to the fact that the present invention, thanks to the total absence of nickel in the process, obviates all problems of an environmental nature which are normally connected with that metal in cladding processes involving alloys of zinc/nickel and/or zinc/cobalt.

Obviously, the invention as conceived is susceptible of many modifications and variations, all of them falling within the scope of the appended claims.

We claim:

1. A cord for reinforcement structures for products made of elastomer material, said cord consisting of a plurality of surface-treated metal wires, each wire comprising a steel core provided with a metal alloy surface cladding consisting essentially of a zinc/manganese binary alloy with a manganese content of between 5% and 80%.

2. A cord as in claim 1, in which the manganese content in the cladding alloy is between 30% and 70%.

3. A cord as in claim 1, in which the surface cladding is formed by electrodeposition on a surface of the steel core.

4. A cord as in claim 1, in which the layer of cladding has a thickness of between 0.1 and 0.35 microns.

5. A cord as in claim 4, having a diameter between 0.15 and 0.35 mm.

6. A cord of claim 1, wherein said surface-treated metal wires of said cord are made by a process for surface-cladding said metal wire for use in manufacture of reinforcement structures for products of elastomer material, said metal wire comprising said steel core provided with said metal alloy surface cladding, said process comprising:

applying at least one immersion phase of the steel core in an electrolytic bath containing zinc sulphate and manganese sulphate to cause a deposition of a layer of the metal alloy surface cladding, said cladding comprising said zinc/manganese alloy with said manganese content of between 5% and 80%.

7. A cord as in claim 6, in which the electrolytic bath comprises a water solution containing:

zinc sulphate heptahydrate at a concentration of between 10 and 90 gr/liter;

manganese sulphate monohydrate at a concentration of between 20 and 100 gr/liter;

sodium citrate at a concentration of between 115 and 230 gr/liter.

8. A cord as in claim 7, wherein the process includes maintaining the electrolytic bath at a temperature of between 20 degrees celsius and 60 degrees celsius.

9. A cord as in claim 7, wherein the process includes maintaining the electrolytic bath at a pH value of between 4 and 6.

10. A cord as in claim 7, wherein the process includes applying a cathodic current density of between 5 and 40 A/dmq to the electrolytic bath.

11. A cord of claim 1, wherein said surface-treated metal wires of said cord are made by a process for surface-cladding said metal wire for manufacture of reinforcement structures for products made of elastomer material, said metal wire comprising said steel core provided with said metal alloy surface cladding, said process comprising:

immersing the steel core in at least a first electrolytic bath containing manganese sulphate, to cause electrodeposition of manganese on the external surface of the core;

immersing the steel core in a second electrolytic bath containing zinc sulphate, to cause deposition of zinc on an external surface of the core;

heat diffusing the zinc and manganese to form a layer of the metal alloy surface cladding, said cladding comprising said zinc/manganese alloy with said manganese content of between 5% and 80%.

12. A cord as in claim 11, in which the first electrolytic bath comprises a water solution containing:

manganese sulphate monohydrate at a concentration between 80 and 120 gr/liter;

ammonium sulphate at a concentration of between 60 and 90 gr/liter; and ammonium thiocyanate at a concentration of between 40 and 80 gr/liter.

13. A cord as in claim 12, wherein the process includes maintaining the first electrolytic bath at a temperature between 20 degrees celsius and 40 degrees celsius.

14. A cord as in claim 12, wherein the process includes maintaining the first electrolytic bath at a pH value between 4.5 and 5.5.

15. A cord as in claim 12, wherein the process includes applying a cathodic current density of between 15 and 25 A/dmq to the first electrolytic bath.

16. A cord as in claim 11, in which the second electrolytic bath contains:

zinc sulphate heptahydrate at a concentration of between 300 and 450 gr/liter;

sodium sulfate at a concentration of between 50 and 70 gr/liter.

17. A cord as in claim 16, wherein the process includes maintaining the second electrolytic bath at a temperature between 20 degrees celsius and 30 degrees celsius.

18. A cord as in claim 16, wherein the process includes maintaining the second electrolytic bath at a pH value of between 2 and 4.

19. A cord as in claim 16, wherein the process includes applying a cathodic current density of between 20 and 40 A/dmq to the second electrolytic bath.

20. A cord as in claim 11, wherein the process includes effecting the heat diffusing by heating the metal wire by Joule effect.

21. A cord of claim 1, wherein said surface-treated metal wires of said cord are made by a process for surface-cladding said metal wire for manufacture of reinforcement structures for products of elastomer material, said metal wire comprising said steel core provided with said metal alloy surface cladding, said process comprising:

immersing the steel core in a first electrolytic bath containing zinc sulphate, to cause electrodeposition of zinc on the external surface of the core;

immersing the steel wire in at least a second electrolytic bath containing manganese sulphate, to cause deposition of manganese on the external surface of said steel wire;

heat diffusing the zinc and manganese to form a layer of the metal alloy surface cladding, said cladding comprising said zinc/manganese alloy with said manganese content of between 5% and 80%.

22. A cord as in claim 21, in which the first electrolytic bath contains:

zinc sulphate heptahydrate at a concentration of between 300 and 450 gr/liter;

sodium sulphate at a concentration of between 50 and 70 gr/liter.

23. A cord as in claim 22, wherein the process includes maintaining the first electrolytic bath at a temperature of between 20 degrees celsius and 30 degrees celsius.

24. A cord as in claim 22, wherein the process includes maintaining the first electrolytic bath at a pH value between 2 and 4.

25. A cord as in claim 22, wherein the process includes applying a cathodic current density between 20 and 40 A/dmq to the first electrolytic bath.

26. A cord as as in claim 21, in which the second electrolytic bath comprises a water solution containing:

manganese sulphate monohydrate at a level between 80 and 120 gr/liter;

ammonium sulphate between 60 and 90 gr/liter; and ammonium thiocyanate between 40 and 80 gr/liter.

27. A cord as in claim 26, wherein the process includes maintaining the second electrolytic bath at a temperature between 20 degrees celsius and 40 degrees celsius.

28. A cord as in claim 26, wherein the process includes maintaining the second electrolytic bath at a pH value between 4.5 and 5.5.

29. A cord as in claim 26, wherein the process includes applying a cathode current density of between 15 and 25 A/dmq to the second electrolytic bath.

30. A cord as in claim 1, said cord consisting of said plurality of surface-treated metal wires, each wire comprising a steel core provided with a metal alloy surface cladding consisting of said zinc/manganese binary alloy with a manganese content of between 5% and 80%.

31. A reinforcement structure of products made of elastomer material, comprising a webbing comprising a plurality of cords, said cords consisting essentially of a plurality of surface-treated metal wires, each wire comprising a steel core provided with a metal alloy surface cladding consisting essentially of a zinc/manganese binary alloy with a manganese content of between 5% and 80%.

32. A product made of elastomer material, incorporating a reinforcement structure comprising a plurality of cords, said cords consisting essentially of a plurality of surface-treated metal wires, each wire comprising a steel core provided with a metal alloy surface cladding consisting essentially of a zinc/manganese binary alloy with a manganese content of between 5% and 80%.

33. A tire for vehicle wheels, incorporating a reinforcement structure comprising a plurality of cords, said cords consisting essentially of a plurality of surface-treated metal wires, each wire comprising a steel core provided with a metal alloy surface cladding consisting essentially of a zinc/manganese binary alloy with a manganese content of between 5% and 80%.

* * * * *